(12) United States Patent
Steiner et al.

(10) Patent No.: US 7,671,549 B2
(45) Date of Patent: Mar. 2, 2010

(54) METHOD AND APPARATUS FOR QUIET FAN SPEED CONTROL

(75) Inventors: James P. Steiner, Royersford, PA (US); Aaron Dobbins, Macungie, PA (US); Chen Ming Wu, Emmaus, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 0 days.

(21) Appl. No.: 12/173,457

(22) Filed: Jul. 15, 2008

(65) Prior Publication Data

US 2009/0072775 A1 Mar. 19, 2009

Related U.S. Application Data

(63) Continuation of application No. 11/560,664, filed on Nov. 16, 2006, now Pat. No. 7,489,094.

(60) Provisional application No. 60/738,017, filed on Nov. 18, 2005.

(51) Int. Cl.
*H02P 7/06* (2006.01)
(52) U.S. Cl. .................. 318/249; 318/245; 318/257; 318/268; 318/772
(58) Field of Classification Search ............... 318/244, 318/245, 249, 257, 268, 700, 772, 779; 388/838, 388/839, 855, 859
See application file for complete search history.

(56) References Cited

U.S. PATENT DOCUMENTS 4,992,709 A * 2/1991 Griffin ........................ 318/249
5,703,458 A * 12/1997 Gershen et al. ............. 318/799

* cited by examiner

*Primary Examiner*—Bentsu Ro
*Assistant Examiner*—Thai Dinh
(74) *Attorney, Agent, or Firm*—Ostrolenk Faber LLP

(57) ABSTRACT

An AC motor speed controller includes a plurality of capacitors that may be selectively switched, by means of controllably conductive switches, into series electrical connection with an AC motor and an AC voltage source to control the speed of the motor. To change the speed of the motor, a control circuit renders a first switch conductive, in response to a first detected AC voltage zero crossing, to charge a first capacitor to a predetermined voltage. The control circuit then renders a second switch conductive, in response to a subsequent second detected AC voltage zero crossing, to charge a second capacitor to the predetermined voltage. The control circuit then renders both switches simultaneously conductive at a predetermined time after a subsequent third detected AC voltage zero crossing. The capacitors will thereby be charged to the same voltage prior to being switched into series with the motor, thereby resulting in reduced acoustic noise when changing motor speeds.

37 Claims, 11 Drawing Sheets

METHOD AND APPARATUS FOR QUIET FAN SPEED CONTROL

CROSS REFERENCE TO RELATED APPLICATIONS

This is a continuation of U.S. patent application Ser. No. 11/560,664, filed Nov. 16, 2006 entitled METHOD AND APPARATUS FOR QUIET FAN SPEED CONTROL, which application claims priority from commonly-assigned U.S. Provisional Patent Application Ser. No. 60/738,017, filed Nov. 18, 2005, having the same title as the present invention, the entire disclosure of which is hereby incorporated by reference.

BACKGROUND OF THE INVENTION

Field of the Invention

The present invention relates to load control devices for providing variable power to alternating-current (AC) loads, for example, motor loads, such as AC fan motors. More particularly, the invention relates to quiet fan speed control, specifically for controlling of the speed of a ceiling-mounted cooling fan quickly while minimizing the generation of acoustic noise.

A problem with known techniques for controlling the speed of fan motors is that some of the methods have produced substantial amounts of acoustic noise in the fan motor and the fan speed control, i.e., the control device operating the fan motor. FIG. 1A shows a prior art variable fan speed control 10. The fan speed control 10 is coupled between an AC power source 16 and a fan motor 18. The fan motor 18 is modeled as an inductor in series with a resistor. The fan motor of a typical ceiling fan has large resistive component, which causes the fan motor 18 to appear mostly resistive to the fan speed control 10.

A controllably conductive switch 12, typically comprising a bidirectional semiconductor switch, such as a triac, is controlled by a control circuit 14 to change the phase angle at which the triac begins conducting each half-cycle of the AC power source, thereby providing variable speed control. As well known to those skilled in the art, by controlling the phase angle at which the triac begins conducting (i.e., the conduction time of the triac each half-cycle of the AC power source), the amount of power delivered to the fan motor 18 and thus the speed of the fan motor, can be controlled.

A problem with the prior art fan speed control 10 is that when a fan motor 18 is controlled by the phase angle technique, mechanical and acoustic noises are generated in the fan motor, which can be annoying and distracting. FIG. 1B shows the waveforms of the AC input voltage 19A, the motor voltage 19B applied to the fan motor 18, and the motor current 19C through the fan motor. As can be observed from the waveforms, the motor voltage 19B has large discontinuities, and thus harmonics, which cause noise and vibration to be generated in the fan motor 18. The harmonics in the motor voltage 19B delivered to the fan motor 18 causes significant amounts of distracting noise and vibration.

FIG. 2A shows another prior art approach that provides a quiet fan speed control 20. In this approach, two capacitors 24, 25 are coupled in series electrical connection between the AC power source 16 and the fan motor 18. Two controllably conductive switches 22, 23, for example, bidirectional semiconductor switches, such as triacs, are provided in series with each of the capacitors 24, 25. A control circuit 26 is operable to control the conduction state of the switches 21, 22, 23 in order to selectively switch one or both of the capacitors 24, 25 in series electrical connection with the fan motor. Accordingly, a voltage divider is formed between the capacitors 24, and the fan motor 18. Different values of capacitance in series with the fan motor 18 produce different voltages across the fan motor, which induce different fan speeds. Typically, as the capacitance in series with the fan motor 18 decreases, the speed of the fan motor will also decrease.

By controlling the switches 22, 23 to selectively insert and remove the capacitors 24, 25 from the circuit, the control circuit 26 can provide a plurality of discrete fan speeds. If either of the switches 22, 23, or any combination of these switches, are conductive, the fan motor will operate at one of the discrete speeds depending upon the equivalent capacitance in series between the AC power source 16 and the fan motor 18. The control circuit 26 drives each triac that must be conductive for a select one of the discrete speeds into substantially full conduction, i.e., the triac conducts approximately the entire length of each half-cycle. Since the fan motor 18 has a large resistive component, the motor current through the fan motor leads the AC input voltage of the AC power source 16 (i.e., is out-of-phase with the AC input voltage) when one or more of the capacitors 24, 25 in coupled in series with the fan motor.

A bypass switch 21 is also controlled by the control circuit 26. When the bypass switch 21 is conductive, the full AC input voltage of the AC power source 16 is provided to the fan motor 18, which then operates at substantially full speed. Accordingly, with the circuit shown in FIG. 2A, as many as four different discrete speeds can be obtained (including the full speed). Additional capacitors and switches can be provided to obtain more discrete speed levels, but the circuitry becomes unnecessarily complex, large, and expensive as more components are added. An example of this type of speed control is shown in U.S. Pat. No. 4,992,709, issued Feb. 12, 1991, entitled SWITCHING CIRCUIT PROVIDING ADJUSTABLE CAPACITIVE SERIES VOLTAGE DROPPING CIRCUIT WITH A FRACTIONAL HORSEPOWER MOTOR, the entire disclosure of which is hereby incorporated by reference.

FIG. 2B shows waveforms of the line voltage 31A, motor voltage 31B, and motor current 31C for the prior art fan speed control 20 of FIG. 2A. As can be observed, the waveforms are fairly continuous and smooth, lacking the discontinuities of the system shown in FIG. 1A. Since the switches 21, 22, 23, are either on or off, and not operated according to the phase control technique of the fan speed control 10 of FIG. 1A, the waveforms do not exhibit discontinuities. Accordingly, minimal noise is generated in the fan motor when the fan speed control 20 is operating in a steady-state condition, i.e., at one of the discrete fan speeds.

However, the fan speed control 20 is susceptible to generating noise when the control circuit 26 changes the speed of the fan motor 18, i.e., when the control circuit changes the conduction state of the switches 22, 23. For example, consider the fan speed control 20 operating with the switch 22 conductive and the switch 23 non-conductive, such that only the capacitor 24 is coupled in series with the fan motor 18. The capacitor 24 will charge and discharge each line cycle in accordance with the AC line voltage provided by the AC power source 16. Assuming that the switch 23 has been non-conductive for a long time, the capacitor 25 will have a substantially low charge, i.e., only a small voltage will be developed across the capacitor 25. To change the speed of the fan motor 18, the control circuit 26 is operable to render the switch 23 conductive and keep the switch 22 conductive. If the control circuit 26 renders the switch 23 conductive when the voltage across the capacitor 24 is substantially different from the voltage across the capacitor 25, a large circulation current will be produced and will flow through both of the capacitors. This large current will cause the plates of the capacitors 24, 25 to contract, making an audible "clicking" noise, which can be annoying to a user of the fan speed control 20. Repetitive occurrences of such a large current can damage the capacitors and other electrical parts of the fan speed control 20, thereby decreasing the life of the fan speed control.

Some prior art fan speed controls have included discharge resistors, for example, resistors 27, 28 of the fan speed control 20 shown in FIG. 2A. The discharge resistors have small resistances and allow the capacitors 24, 25 to discharge quickly. Also, the fan speed control 20 may include limiting resistors 29, 30 to limit the peak discharge current. When changing speeds of the fan motor 18, the control circuit will cause the switches 22, 23 to be non-conductive for a predetermined period of time to allow the capacitors to discharge, before rendering one or more of the capacitors conductive. However, since a period of time is required to allow the capacitors 24, 25 to discharge, this method of control limits the speed at which the fan speed control 20 can change the speed of the fan motor 18. Further, the discharge resistors 27, 28 dissipate a large amount of power during normal operation of the fan speed control 20, thus requiring rather large and expensive resistors. Accordingly, there is a need for a quiet fan speed control that can quickly change the speed of the fan motor without generating excessive noise in the fan speed control and that does not generate excessive heat during normal operation.

Furthermore, the fan motor 18 often has trouble starting up when the fan motor is turned on to a very low speed from off. To overcome this problem in the prior art fan speed control 20, the control circuit 26 initially "kick starts" the fan motor 18 by driving the fan motor at the maximum speed possible, i.e., rendering the bypass switch 21 conductive, for a predetermined period of time. After this period of time, the fan motor 18 will be rotating with an acceptable amount of inertia and the control circuit 26 will then control the switches 24, 25 to switch the appropriate capacitance in series with the fan motor 18 to produce the desired lower speed. However, changing the speed of the fan motor 18 from the initial off speed to the full speed, and then back down to the desired low speed, can generate a large pulse of current through the fan motor, which can cause the fan motor to make an audible "clunking" noise. As previously mentioned, acoustic noises produced in the fan motor can be annoying and distracting to a user. Accordingly, there is a need for a quiet fan speed control that is able to start up a fan motor to a low speed without causing the fan motor to make excessive noise.

SUMMARY OF THE INVENTION

According to the present invention, a load control device for controlling the speed of an AC motor to be driven from an AC supply voltage of an AC power source comprises first and second capacitors, first and second controllably conductive switches, and a control circuit. Each of the capacitors are adapted to be coupled in series electrical connection between the AC power source and the AC motor. The first controllably conductive switch is coupled in series electrical connection with the first capacitor and the second controllably conductive switch is coupled in series electrical connection with the second capacitor. The control circuit renders the first and second controllably conductive switches conductive and non-conductive to provide a plurality of discrete speeds of the AC motor. The control circuit is operable to change the speed of the AC motor by: (1) rendering the first switch conductive at a first zero-crossing of the AC supply voltage to allow the first capacitor to substantially charge to a predetermined voltage; (2) rendering the second switch conductive at a second zero-crossing of the AC supply voltage to allow the second capacitor to substantially charge to the predetermined voltage; and (3) rendering the first and second switches conductive at a predetermined time after a third zero-crossing of the AC supply voltage.

The present invention also provides a method for changing the speed of an AC motor in a load control device comprising a first capacitor and a second capacitor, each of the first and second capacitors adapted to be coupled in series electrical connection between an AC power source and the AC motor, a first controllably conductive switch coupled in series electrical connection with the first capacitor, and a second controllably conductive switch coupled in series electrical connection with the second capacitor. The method comprises the steps of rendering the first switch conductive at a first zero-crossing of the AC supply voltage to allow the first capacitor to substantially charge to a predetermined voltage, rendering the second switch conductive at a second zero-crossing of the AC supply voltage to allow the second capacitor to substantially charge to the predetermined voltage, and rendering the first and second switches conductive at a predetermined time after a third zero-crossing of the AC supply voltage.

Other features and advantages of the present invention will become apparent from the following description of the invention that refers to the accompanying drawings.

DETAILED DESCRIPTION OF THE INVENTION

Figure 1A:
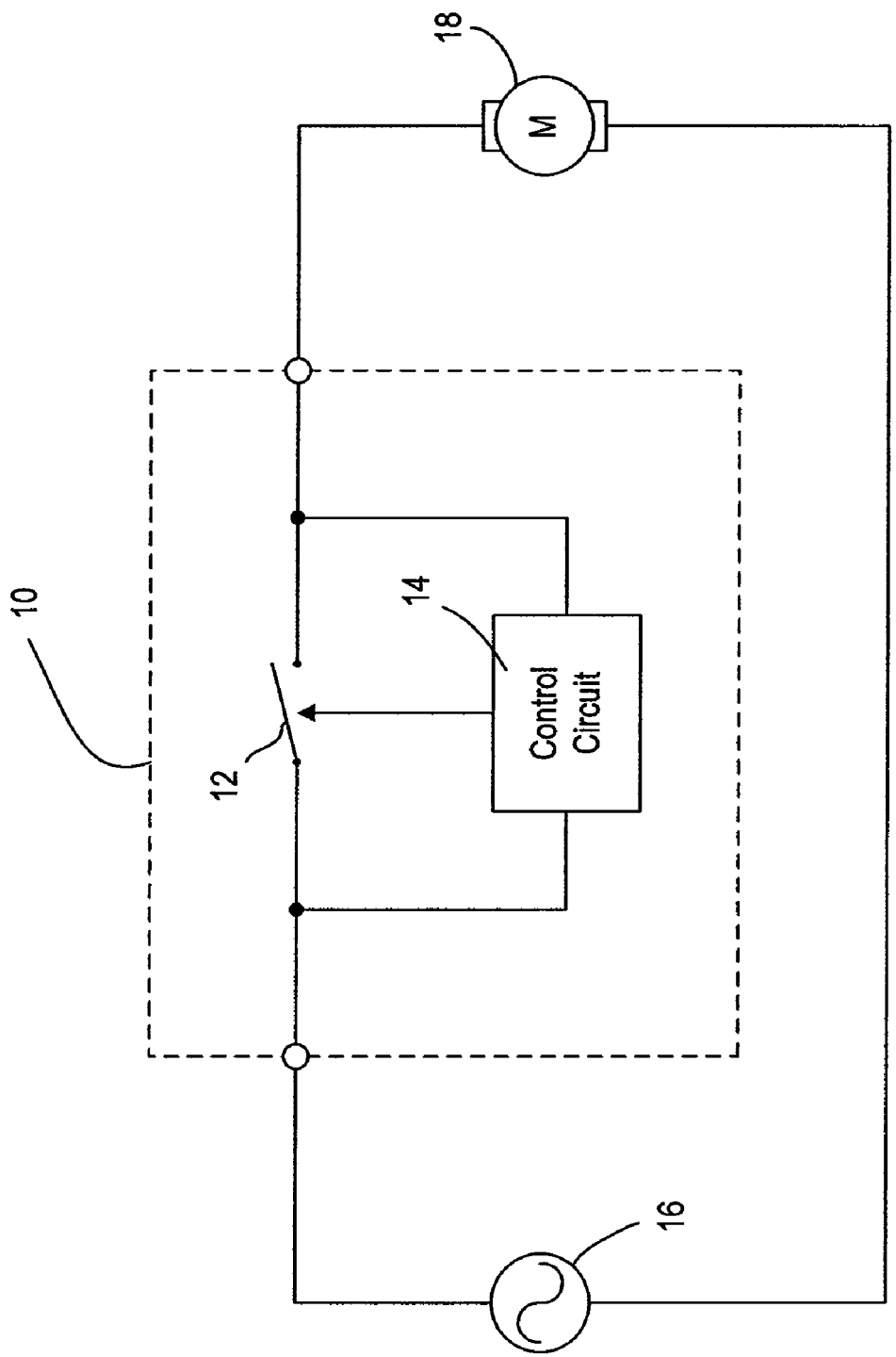
FIG. 1A is a simplified schematic diagram of a prior art variable fan speed control.
Figure 1B:
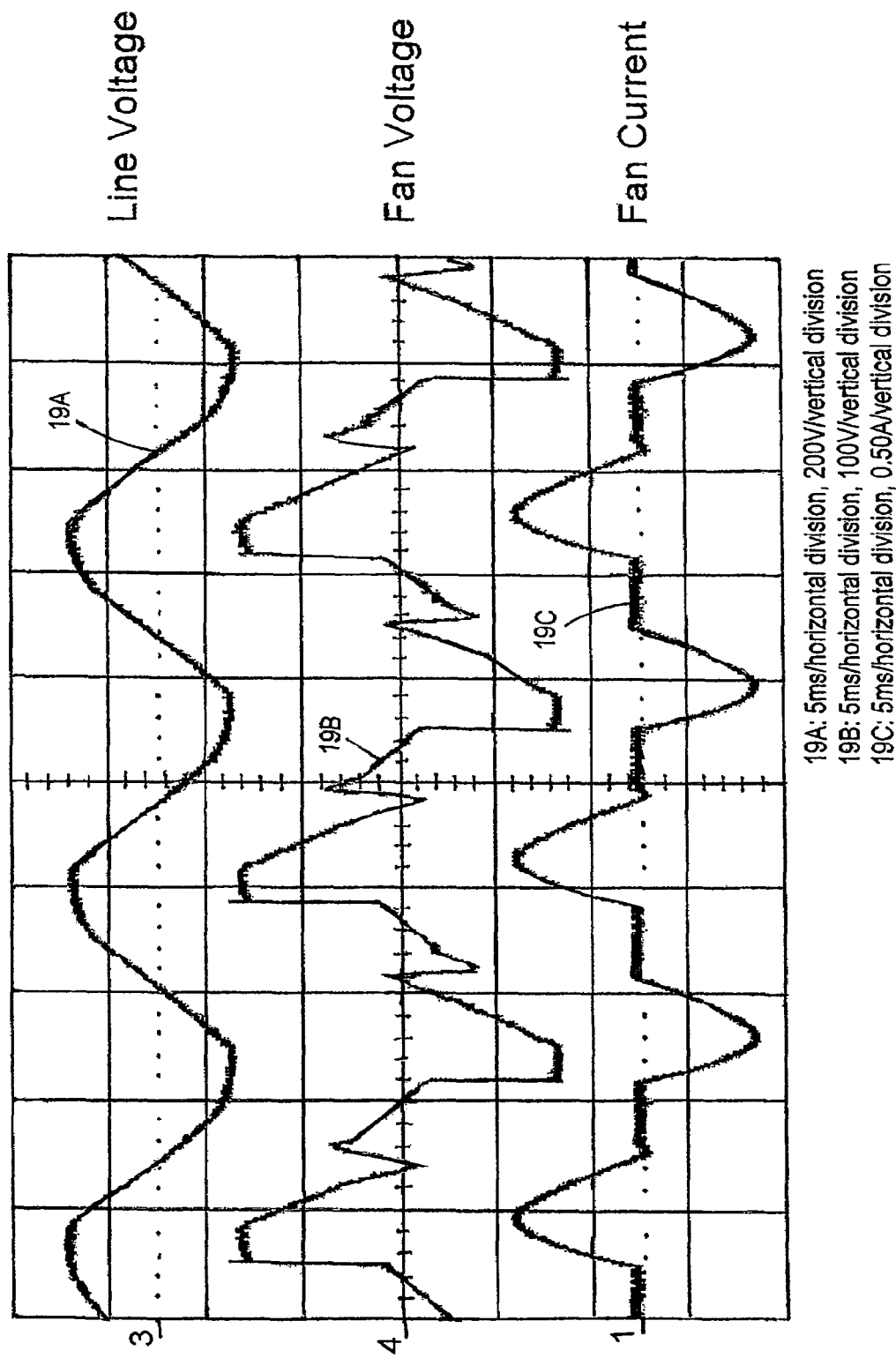
FIG. 1B shows electrical waveforms for the fan speed control of FIG. 1A.
Figure 2A:
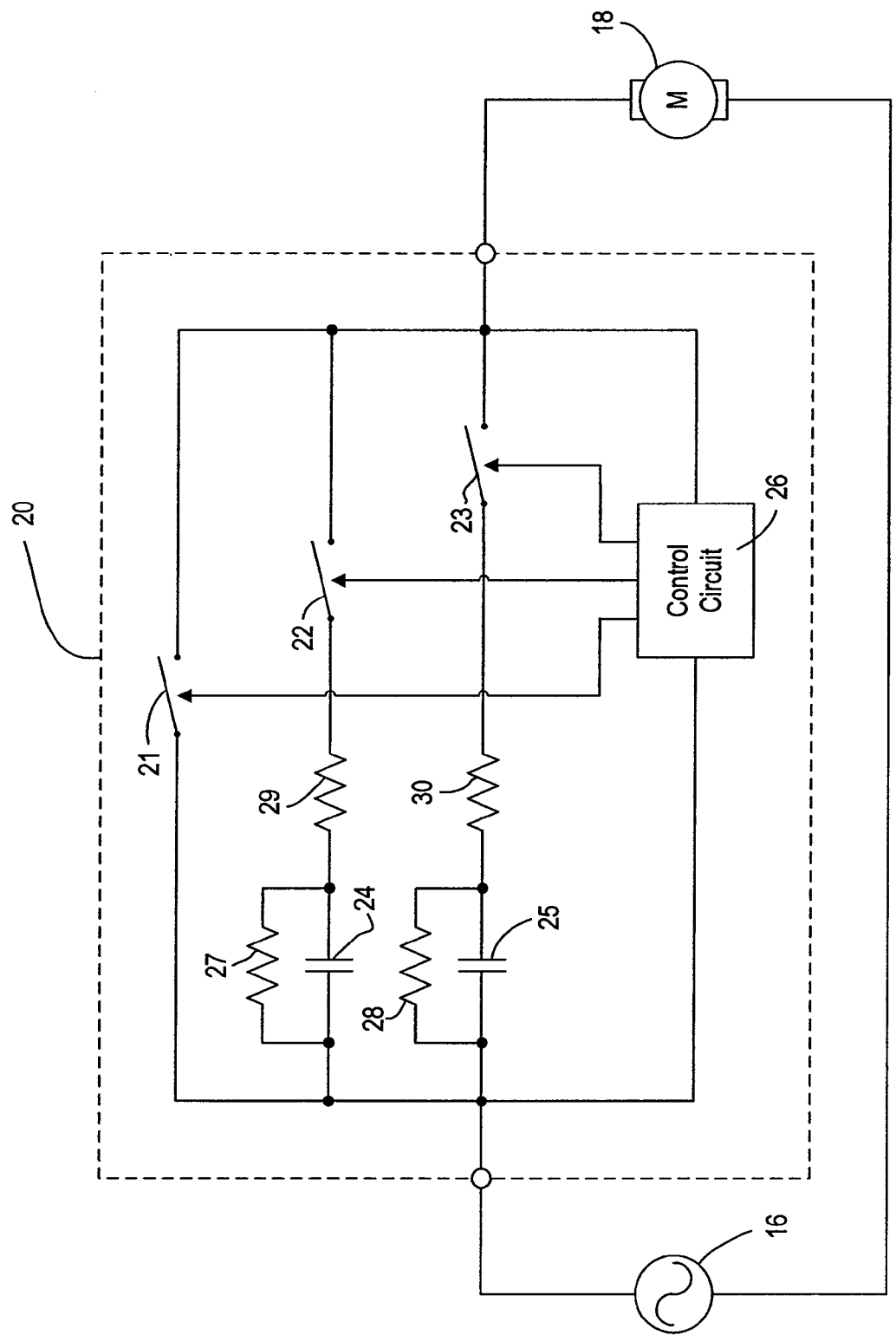
FIG. 2A is a simplified schematic diagram of a second prior art fan speed control.
Figure 2B:
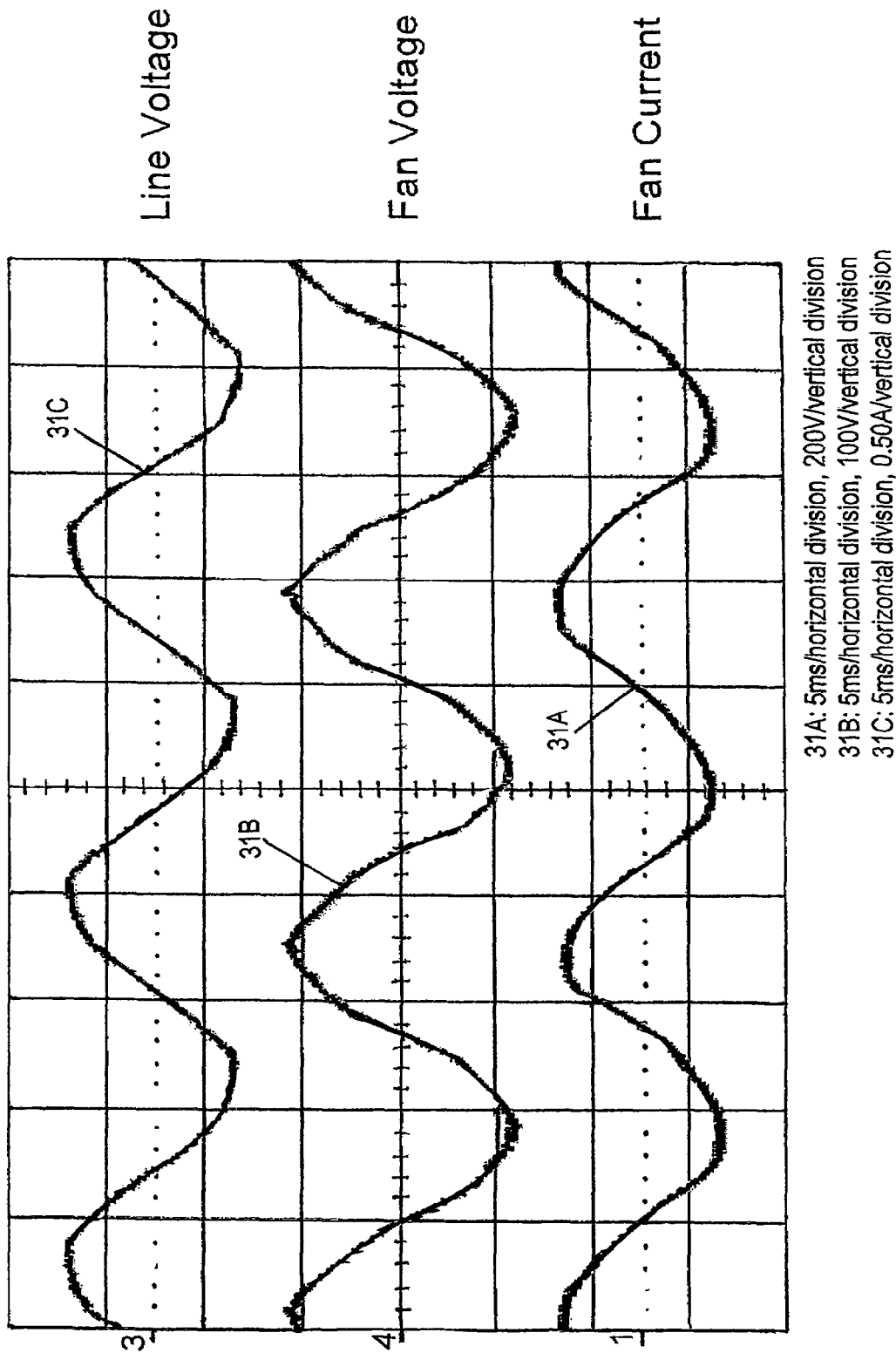
FIG. 2B shows electrical waveforms for the fan speed control of FIG. 2A.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

Figure 3:
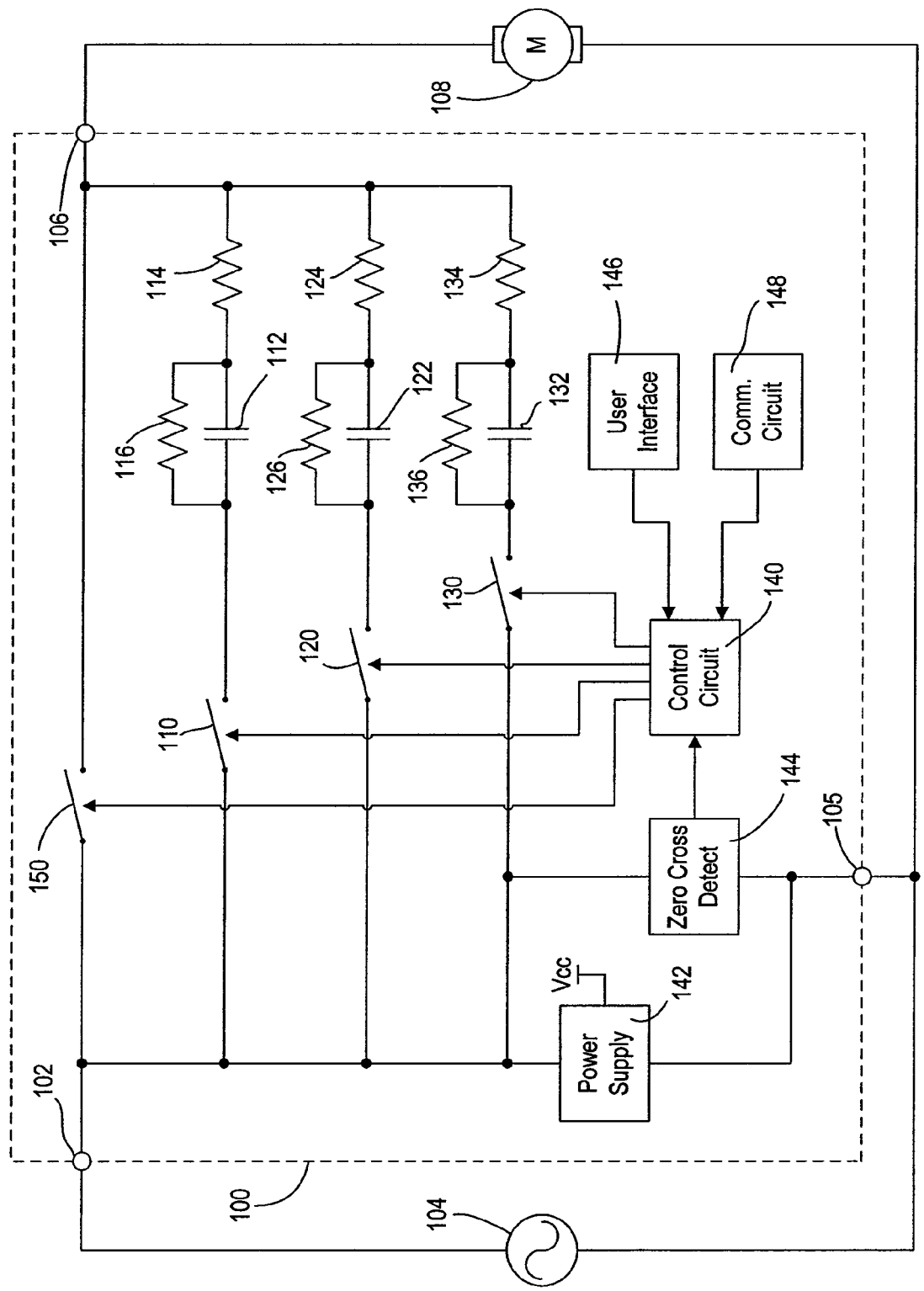
FIG. 3 is a simplified schematic diagram of a fan speed control according to the present invention.

FIG. 3 is a simplified schematic diagram of a quiet fan speed control 100 according to the present invention. The fan speed control 100 has a hot terminal 102 adapted to be coupled to the hot side of an AC power source 104, a neutral connection 105 adapted to be coupled to the neutral side of the AC power source, and a load terminal 106 adapted to be coupled to an AC fan motor 108. The fan motor 108 may be a brushless or brushed motor, although typically, it will be a brushless synchronous or induction motor.

Figure 3B:
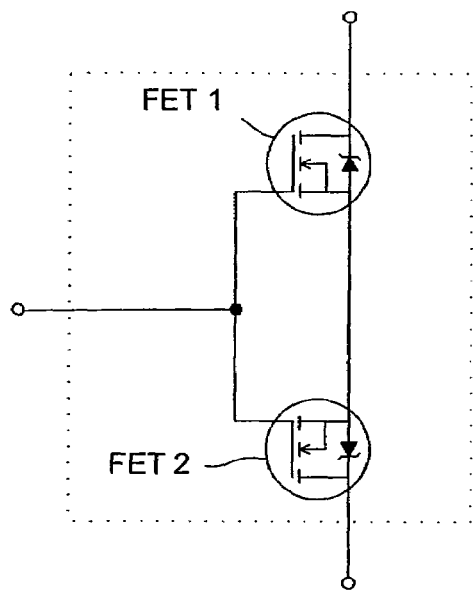
FIGS. 3A, 3B and 3C show examples of bidirectional switches that can be used in the described circuits.
Figure 3C:
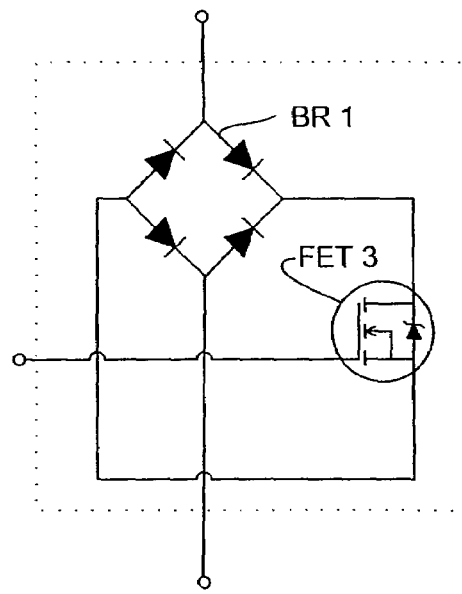
Figure 3A:
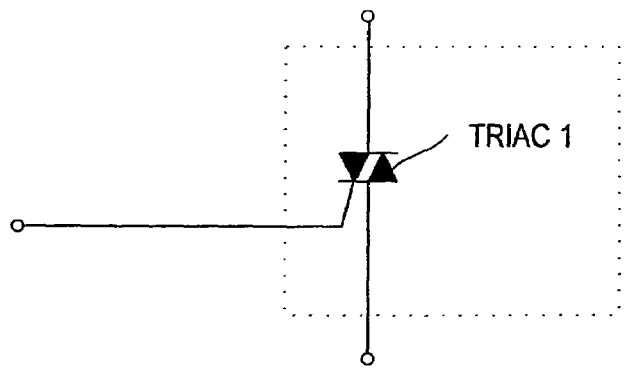

As in the prior art fan speed controls 10, 20, the fan speed control 100 of the present invention provides a plurality of discrete speeds of the fan motor 108 by selectively switching one or more of a plurality of capacitors 112, 122, 132 in series electrical connection between the AC power source 104 and the fan motor. A plurality of controllably conductive switches 110, 120, 130 are coupled between the hot terminal and the load terminal in series electrical connection with the capacitors 112, 122, 132, respectively. The switches 110, 120, 130 may be relays or any suitable bidirectional semiconductor switch such as a triac, a field-effect transistor (FET) in a full-wave rectifier bridge, two FETs coupled in anti-series connection, or an insulated-gate bipolar transistor (IGBT). The capacitors 112, 122, 132 preferably have capacitances of 3.3 µF, 4.7 µF, and 9 µF, respectively. Examples of suitable bidirectional switches are shown in FIGS. 3A (triac), 3B (two anti-series FETs) and FIG. 3B (FET in a full wave bridge). These are all well known to those of skill in the art.

The capacitors 112, 122, 132 are coupled in series with a plurality of limiting resistors 114, 124, 134, respectively, which limit the currents through the capacitors. The limiting resistor 114 preferably has a resistance of 1.5 Ω, while the limiting resistors 124, 134 both preferably have a resistance of 0.47 Ω. A plurality of discharge resistors 116, 126, 136 are coupled in parallel with the capacitors 112, 122, 132, respectively. The discharge resistors 116, 126, 136 have a substantially large resistance, e.g., 300 kΩ, such that the capacitors 112, 122, 132 are operable to discharge at a slow rate when the switches 110, 120, 130 are not conductive.

A control circuit 140 is provided to selectively control the conduction state of each of the switches 110, 120, 130. The control circuit 140 is preferably implemented as a microcontroller, but may be any suitable processing device, such as a programmable logic device (PLD), a microprocessor, or an application specific integrated circuit (ASIC). Operating in a similar fashion to the prior art fan speed control 20 of FIG. 3, the control circuit 140 selectively renders each switch 110, 120, 130 conductive or non-conductive to switch one of a plurality of seven different equivalent capacitances in series with the fan motor 108. Accordingly, the fan speed control 100 is operable to provide seven discrete speeds of the fan motor 108 by switching in one or more capacitors as shown in the following table.

TABLE 1

Equivalent Capacitances for Various Fan Speeds

| Fan Speed # | Capacitors In The Circuit | Equivalent Capacitance ($C_{EQ}$) |
| --- | --- | --- |
| 1 (Lowest) | $C_{112}$ | 3.3 µF |
| 2 | $C_{122}$ | 4.7 µF |
| 3 | $C_{112} \| C_{122}$ | 8 µF |
| 4 | $C_{132}$ | 9 µF |

TABLE 1-continued

Equivalent Capacitances for Various Fan Speeds

| Fan Speed # | Capacitors In The Circuit | Equivalent Capacitance ($C_{EQ}$) |
| --- | --- | --- |
| 5 | $C_{112} \| C_{132}$ | 12.3 µF |
| 6 | $C_{122} \| C_{132}$ | 13.7 µF |
| 7 (Highest) | $C_{112} \| C_{122} \| C_{132}$ | 17 µF |

A power supply 142 is coupled between the hot connection 102 and the neutral connection 105 and generates a DC output voltage $V_{CC}$ to power the control circuit 140. A zero-cross detect circuit 144 determines the zero-crossing points of the AC supply voltage from the AC power source 104. A zero-crossing is defined as the time at which the AC supply voltage transitions from positive to negative polarity, or from negative to positive polarity, at the beginning of each half-cycle. The zero-crossing information is provided as an input to control circuit 140. The control circuit 140 determines when to change the conduction states of the switches 110, 120, 130 relative to the zero-crossing points of the AC supply voltage. According to the method of the present invention, the fan speed control 100 is operable to control the switches 110, 120, 130 such that generation of potential noise due to the switching of the capacitors 112, 122, 132 is reduced to acceptable levels.

The control circuit 140 may receive inputs from a user interface 146 having one or more actuators or from a communication circuit 148, which may be coupled to a communication link (not shown) such as a wired serial control link, a power-line carrier (PLC) communication link, an infrared (IR) communication link, or a radio frequency (RF) communication link. The control circuit 140 is operable to change the speed of the fan motor 108 in response to the inputs received from the user interface 146 or the communication circuit 148.

The fan speed control 100 further comprises a bypass switch 150 coupled between the hot terminal 102 and the load terminal 106. The bypass switch 150 is also controlled by the control circuit 140 and allows the fan speed control 100 to drive the fan motor 108 to substantially full speed operation by supplying substantially all of the voltage provided by the power source 104 to the fan motor 108. The bypass switch 150 may be any suitable bidirectional semiconductor switch, for example, a triac or two FETs coupled in anti-series connection.

Figure 4:
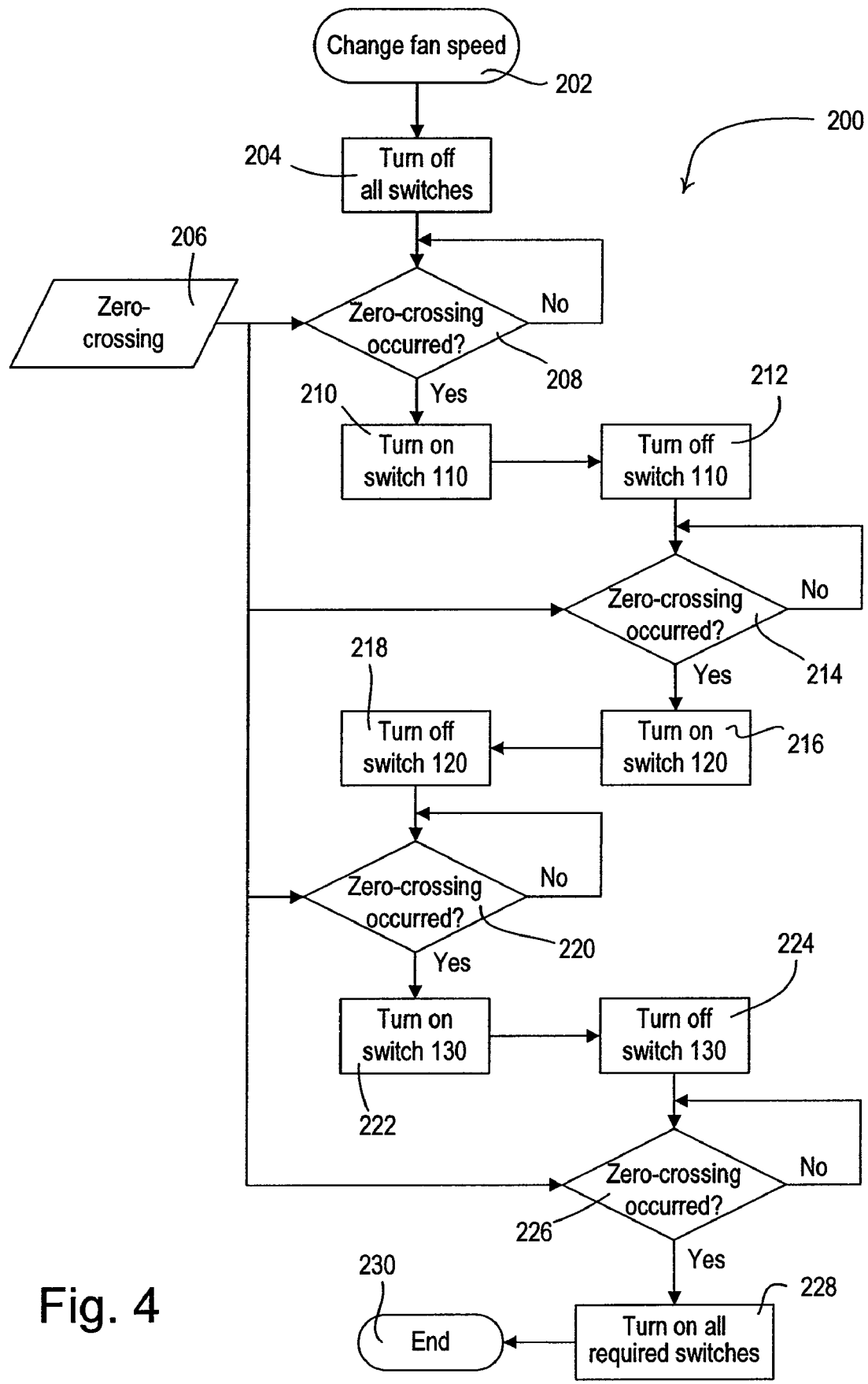
FIG. 4 is a flowchart of the method for controlling the fan speed control of FIG. 3 according to the present invention.

A flowchart of the method 200 for controlling the switches 110, 120, 130 to achieve quiet fan speed control according to the present invention is shown in FIG. 4. The method 200 allows the fan speed control 100 to change the speed of the fan motor 108 without generating excessive acoustic noise in the capacitors 112, 122, 132 by allowing each capacitor to charge to a predetermined level before switching any combination of the capacitors together in parallel.

Figure 5:
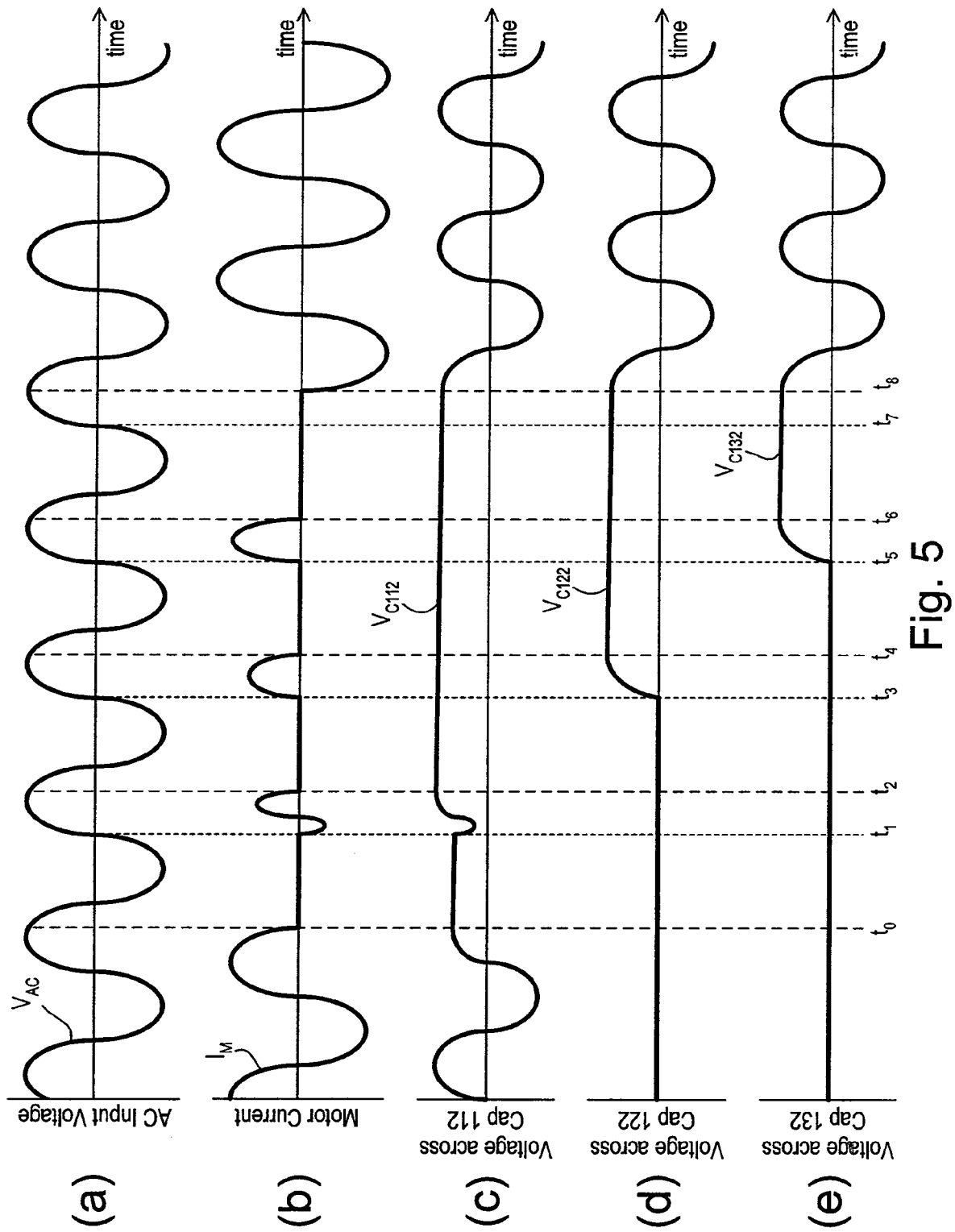
FIG. 5 shows example voltage and current waveforms of the fan speed control of FIG. 3 in accordance with the method of FIG. 4.

FIG. 5 demonstrates example voltage and current waveforms of the fan speed control 100 in accordance with the method 200 shown in FIG. 4. FIG. 5(a) shows an AC input voltage $V_{AC}$ waveform received at the hot terminal 102 of the fan speed control 100. FIG. 5(b) shows a waveform of the motor current $I_M$ through the fan motor 108. FIGS. 5(c), 5(d), 5(e) show the voltages $V_{C112}$, $V_{C122}$, $V_{C132}$ across the capacitors 112, 122, 132, respectively. In the example of FIG. 5, the fan speed control 100 is changing the speed of the fan motor 18 from the lowest fan speed, i.e., the fan speed #1 in Table 1, to the fan speed #7. At the beginning of the example, only the switch 110 is conductive and the capacitor 112 is in series with the fan motor 108.

The method 200 of FIG. 4 begins at step 202 whenever a change in the fan speed is required. First, at step 204, the control circuit 140 renders non-conductive those switches 110, 120, 130 that are presently conductive (in this example, switch 110). Since the switches 110, 120, 130 of the preferred embodiment are triacs, the control circuit 140 simply stops driving the switches and all of the switches will be rendered non-conductive after the next zero-crossing of the motor current $I_M$ (i.e., when the motor current $I_M$ goes to zero amps at time to of FIG. 5). The voltage $V_{C112}$ across the capacitor 112 will begin to slowly decay as it discharges through the resistor 116.

A zero-crossing input 206 is provided to the control circuit 140 from the zero cross detect circuit 144. At step 208, the control circuit 140 waits for the next zero-crossing of the AC input voltage $V_{AC}$. When the next zero-crossing occurs (i.e., time $t_1$ of FIG. 5), the control circuit 140 renders the switch 110 conductive at step 210. The motor current $I_M$ will pulse briefly as the capacitor 112 charges and the voltage $V_{C112}$ across the capacitor 112 increases with the AC input voltage $V_{AC}$. When the voltage $V_{C112}$ has charged to a first predetermined voltage, the control circuit 140 will render the switch 110 non-conductive at step 212 (at time $t_2$ in FIG. 5). Because the switch 110 is preferably implemented as a triac, the switch 110 will simply commutate off when the motor current $I_M$ is substantially zero amps, i.e., less than the holding current of the triac, for example, less than 50 milliamps. Since the current through a capacitor tends to lead the voltage across the capacitor, for example, by 90 degrees, the voltage $V_{C112}$ is preferably at substantially a peak value when the motor current $I_M$ falls to approximately zero amps. After the switch 110 stops conducting, the voltage $V_{C112}$ across the capacitor 112 will begin to slowly decay.

Referring back to FIG. 4, the process continues as the control circuit 140 waits for the next zero-crossing at step 214. When the next zero-crossing occurs (i.e., at time $t_3$ in FIG. 5), the control circuit renders the switch 120 conductive at step 216. Similar to the charging of the capacitor 112 (as described above), the capacitor 122 also charges to a second predetermined voltage, preferably substantially the same as the first predetermined voltage (at time $t_4$). Once again, the control circuit waits for the next zero-crossing at step 220. After the next zero-crossing (i.e., at time $t_5$), the control circuit renders the switch 130 conductive at step 212 and the capacitor 132 will charge to a third predetermined voltage, preferably substantially the same as the first and second predetermined voltages (at time $t_6$).

At the next zero-crossing of the AC input voltage $V_{AC}$ (i.e., at time $t_7$), the voltages $V_{C112}$, $V_{C122}$, $V_{C132}$ on the capacitors 112, 122, 132 are preferably substantially the same even though the capacitors having been discharging for the previous few half-cycles. After detecting the zero-crossing at step 226, the control circuit waits at step 228 for a predetermined time period, e.g., preferably for ¼ of a line cycle or approximately 4 msec with a 60-Hz AC power source. After this period of time, the control circuit 140 turns all switches 110, 120, 130 on at the same time (i.e., at time $t_8$), thus coupling the parallel combination of all three capacitors 112, 122, 132 in series between the AC power source 104 and the fan motor 108. Since all of the capacitors 112, 122, 132 are at approximately the same voltage when the switches are rendered conductive, no large circulating currents are generated through the capacitors and substantially no audible acoustic noise occurs in the capacitors. Finally, the process of FIG. 4 exits at step 230. Note that the entire process of FIG. 4 only takes the length of four line cycles of the AC input voltage $V_{AC}$.

Note that the waveforms as shown in FIG. 5 are only one possible example of the fan speed control 100 changing the speed of the fan motor 18. Alternatively, the fan speed control 100 might change the speed of the fan motor 18 from fan speed #6 to fan speed #2. In this case, two switches 120, 130 would be conductive at the beginning of the process and only the switch 120 would be conductive at the end of the process. Further, note that the capacitors 112, 122, 132 are all charged in the positive half-cycles such that the voltages across the capacitors have the same polarity. Alternatively, the method 200 of FIG. 4 could be implemented such that the capacitors 112, 122, 132 charge in the negative half-cycles.

Even though the switches 110, 120, 130 all commutate off when the motor current $I_M$ through the switches is substantially zero amps in the embodiment described above, the capacitors 112, 122, 132 will not typically charge to exactly the same voltage, and thus, the first, second, and third predetermined voltages will not be exactly the same. Since each capacitor 112, 122, 132 has a different capacitance, a different voltage divider is formed (between the one of the capacitors that is switched in and the fan motor 18) when each capacitor is charging. Accordingly, each capacitor 112, 122, 132 will charge to a slightly different voltage. Further, since the discharge resistors 116, 126, 136 all have the same resistance, i.e., 300 kΩ, the capacitors 112, 122, 132 will discharge at different rates.

The capacitors 112, 122, 132 and the discharge resistors 116, 126, 136 are chosen such that after the capacitors have first charged and then discharged during the required time period, (i.e., four line cycles), the voltages across the capacitors will be substantially the same at the time when the capacitors are combined in parallel (i.e., at ¼ of a line cycle after the third zero-crossing). It is desirable to switch two or more of the capacitors 112, 122, 132 in parallel together when the difference in the voltages across the capacitors is no greater than 30 volts, which limits the magnitude of the circulating current to no greater than approximately 32 amps. Above this level, the fan speed control is more likely to generate excessive audible noise when switching between speeds and to produce circulating currents through the capacitors 112, 122, 132 that could potentially damage the switches 110, 120, 130 and the limiting resistors 114, 124, 134. More preferably, the difference in the voltages across the capacitors 112, 122, 132 should be no greater than 20 volts with the circulating current having a magnitude no greater than approximately 21.2 amps. While the values of the capacitors 112, 122, 132, the limiting resistors 114, 124, 134, and the discharge resistors 116, 126, 136 preferably have values as described above, other values may be used for these components. Although the preferred embodiment uses discharge resistors having equal values, the values of the individual resistors may be chosen independently so as to cause the capacitor voltages to decay at desired rates that render them more nearly identical when the capacitors are switched together in parallel.

Preferably, the capacitors 112, 122, 132 are charged in order of increasing capacitance. Specifically, the capacitor 112, which has the smallest capacitance, charges first; the capacitor 122 charges second; and the capacitor 132, which has the largest capacitance, charges last.

Using the process of FIG. 4 to change the fan speed from a first speed to a second speed, the control circuit 140 turns on all of the switches 110, 120, 130 to charge all of the capacitors 112, 122, 132 even though each of the three capacitors might not be needed in the first and second speeds. This allows for a simple control algorithm. Alternatively, when changing fan speeds, the control circuit 140 could only charge those capacitors 112, 122, 132 that will be used in the second speed. For example, to change from fan speed #1 to fan speed #4, the control circuit 140 would need to stop driving switch 110 into conduction and begin driving switch 130 into conduction. The control circuit 140 does not need to render the switch 110 or the switch 120 conductive to charge the capacitor 112 or the capacitor 122 and can thus complete the process in a shorter amount of time, i.e., one line cycle shorter.

In the method 200 of the preferred embodiment, the steps 212, 218, 224 of turning off the switches 110, 120, 130 are simply executed by allowing the switches, i.e., the triacs, to commutate off when the motor current $I_M$ is substantially zero amps. Alternatively, each of the switches 110, 120, 130 may be implemented as two FETs in anti-series connection or another type of bidirectional semiconductor switch with which the control circuit 140 is operable to directly render the switches non-conductive. Accordingly, the control circuit 140 may be operable to render the switches 110, 120, 130 non-conductive using a different method as described in conjunction with steps 212, 218, 224 above. Further, the control circuit 140 may be operable to render the semiconductor switches 110, 120, 130 non-conductive when the voltage across the capacitors 112, 122, 132 have reached a predetermined voltage other than the peak of the AC input voltage $V_{AC}$.

In a first alternative method, the control circuit 140 of the fan speed control 300 is operable to time from the zero-crossings of the AC input voltage $V_{AC}$ to determine when to render the switches 110, 120, 130, non-conductive, preferably, 90 degrees after each zero-crossing (i.e., at times $t_2$, $t_4$, $t_6$ in FIG. 4).

Figure 6A:
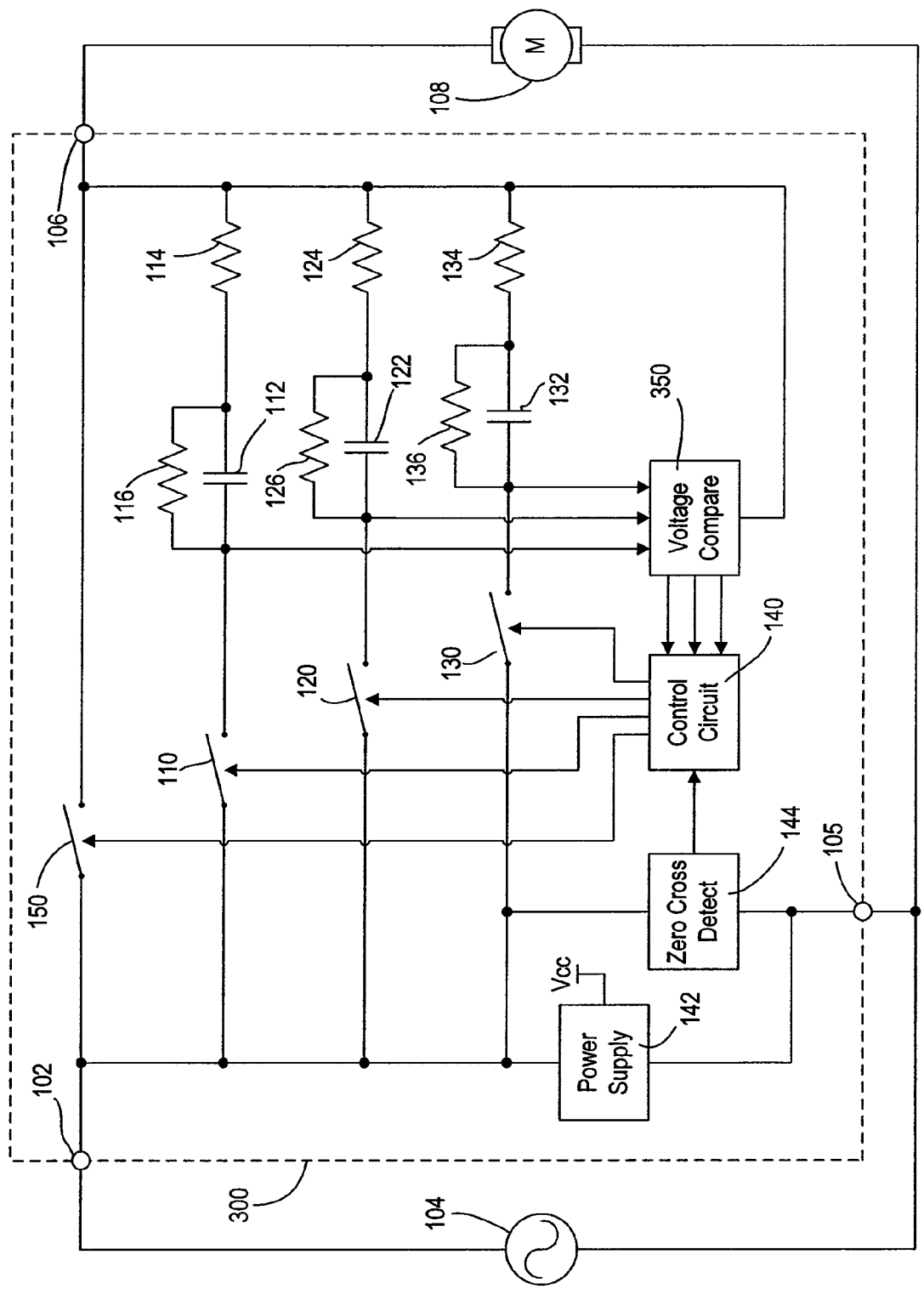
FIG. 6A is a simplified schematic diagram of a quiet fan speed control according to a second embodiment of the present invention.
Figure 6B:
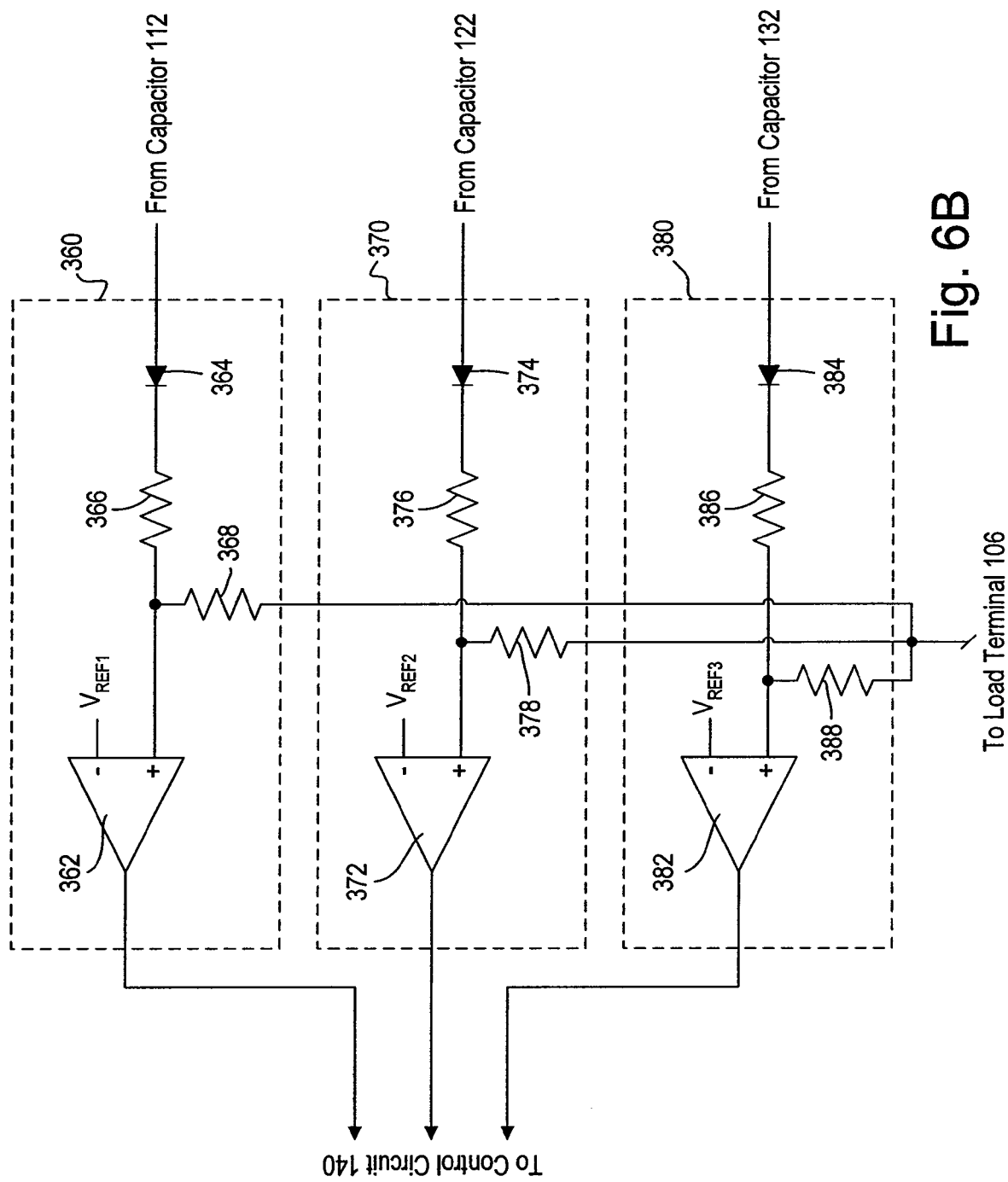
FIG. 6B is a simplified schematic diagram of a voltage compare circuit of the fan speed control of FIG. 6A.

In a second alternative method, the voltages across the capacitors 112, 122, 132 are monitored to determine when to turn off the switches 110, 120, 130. FIG. 6A is a simplified schematic diagram of a quiet fan speed control 300 according to a second embodiment of the present invention. The fan speed control 300 includes a voltage compare circuit 350, which is operable to receive the voltages across each of the capacitors 112, 122, 132. FIG. 6B is a simplified schematic diagram of a possible implementation of the voltage compare circuit 350. The voltage compare circuit 350 comprises three comparator circuits 360, 370, 380 for comparing each of the voltages across the capacitors 112, 122, 132 to a reference voltage $V_{REF1}$, $V_{REF2}$, $V_{REF3}$, respectively. The first comparator circuit 360 includes a comparator 362 with the reference voltage $V_{REF1}$ connected to the negative input. The voltage across the capacitor 112, 122, 132 is received through a diode 364 during the positive half-cycles of the motor current $I_M$. The voltage is scaled down to an appropriate value, i.e., less than the DC output voltage $V_{CC}$ of the power supply 142, using a resistor divider comprising two resistors 366, 368. The scaled voltage is coupled to the positive input of the comparator 362, such that when the voltage across the capacitor 112 exceeds the reference voltage $V_{REF1}$, the comparator drives the output, which is provided to the control circuit 140, high. The comparator circuits 370, 380 function the same as the comparator circuit 360 described above. The control circuit 140 is operable to render the switches 110, 120, 130 non-conductive upon receiving the appropriate control signal from the comparator circuits 360, 370, 380, respectively. Preferably, the reference voltages $V_{REF1}$, $V_{REF2}$, $V_{REF3}$, are the same voltage, such that each of the capacitors 112, 122, 132 are substantially charged to the same predetermined voltage. However, the reference voltages may be different to account for the voltage decay of the capacitors during the times that the capacitors are not charging.

Figure 6C:
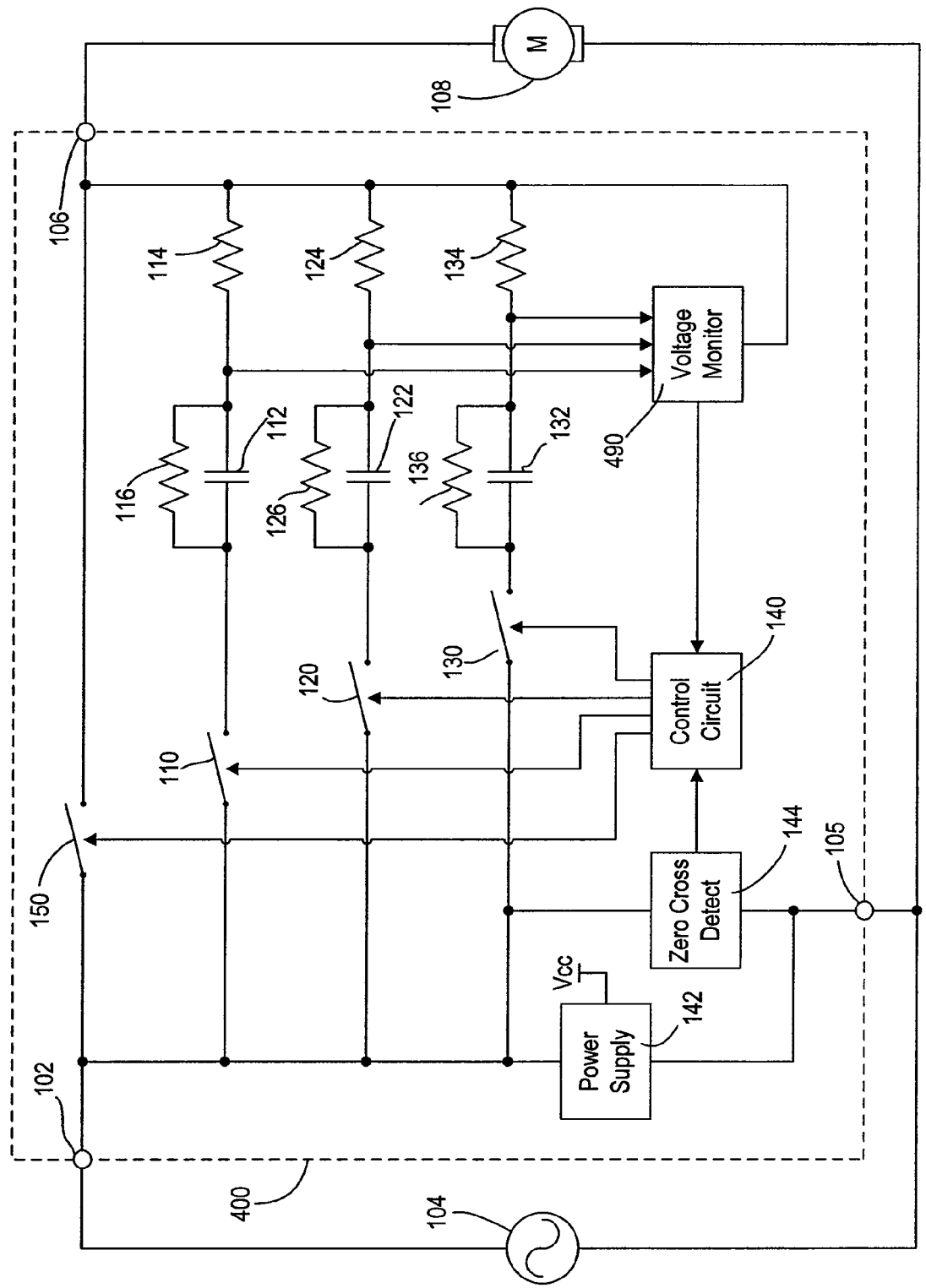
FIG. 6C is a simplified schematic diagram of a quiet fan speed control according to a third embodiment of the present invention.

In a final alternative embodiment, the control circuit 140 is operable to monitor the motor current $I_M$ through the fan motor 108 in order to control the switches 110, 120, 130. FIG. 6C is a simplified schematic diagram of a quiet fan speed control 400 according to a third embodiment of the present invention. The fan speed control 400 includes a voltage monitor circuit 490, which provides to the control circuit 140 a signal representative of the zero-crossings of the voltage across the limiting resistors 116, 126, 136, and thus the zero-crossings of the motor current $I_M$. Accordingly, the control circuit 140 is operable to turn off the switches 110, 120, 130 at the zero-crossings of the motor current $I_M$.

To start up the fan motor 108 from off to a substantially low speed (e.g., speed #1 or speed #2 of Table 1) without generating excessive acoustic noise in the fan motor, the fan speed control 100 of the present invention first turns on the fan motor to an intermediate speed, i.e., not the maximum or near the maximum possible speed, and then switches to the desired lower speed. First, the control circuit 140 controls the fan speed to an intermediate speed, e.g., fan speed #4 (as shown in Table 1), by rendering only switch 130 conductive using the method of FIG. 4. After a predetermined amount of time, the control circuit 140 controls the fan speed to the desired lower level, once again using the method of FIG. 4. For example, if the desired lower level is fan speed #1, the control circuit 140 renders only the switch 110 conductive to couple capacitor 112 in series with the fan motor 108. Since the fan speed is not being controlled from off to the maximum speed and then quickly down to the desired low speed, the current pulse through the fan motor 108 has a smaller magnitude than with the prior art "kick start" method and substantially no audible acoustic noise is generated in the fan motor.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A load control device for controlling the speed of an AC motor to be driven from an AC supply voltage of an AC power source, the load control device comprising:

a first capacitor and a second capacitor, each of the first and second capacitors adapted to be coupled in series electrical connection between the AC power source and the AC motor;

a first controllably conductive switch coupled in series electrical connection with the first capacitor and a second controllably conductive switch coupled in series electrical connection with the second capacitor; and a control circuit operable to control the first and second controllably conductive switches to provide a plurality of discrete speeds of the AC motor, the control circuit operable to render both of the first and second switches non-conductive to turn off the motor, the control circuit operable to render the first switch conductive and the second switch non-conductive to couple only the first capacitor in series electrical connection between the AC power source and the AC motor to control the speed of the motor to a first discrete speed, the control circuit operable to render the second switch conductive and the first switch non-conductive to couple only the second capacitor in series electrical connection between the AC power source and the AC motor to control the speed of the motor to a second discrete speed, the control circuit further operable to render both of the first and second switches conductive to couple the parallel combination of the first and second capacitors in series electrical connection between the AC power source and the AC motor to control the speed of the motor to a third discrete speed;

wherein the control circuit is operable to change the speed of the AC motor to the third speed by rendering the first switch conductive during a first line cycle of the AC supply voltage to allow the first capacitor to charge to approximately a first predetermined voltage;

rendering the second switch conductive during a second subsequent line cycle of the AC supply voltage to allow the second capacitor to charge to approximately a second predetermined voltage; and rendering the first and second switches conductive at approximately the same time during a third subsequent line cycle of the AC supply voltage.

2. The load control device of claim 1, wherein the controllably conductive switches comprise bidirectional semiconductor switches.

3. The load control device of claim 2, wherein the bidirectional semiconductor switches comprise triacs.

4. The load control device of claim 3, wherein the triacs become non-conductive when a current through the AC motor becomes substantially zero amps.

5. The load control device of claim 3, wherein the first and second predetermined voltages are approximately the peak of the AC supply voltage.

6. The load control device of claim 2, wherein each bidirectional semiconductor switch comprises two field-effect transistors coupled in anti-series connection.

7. The load control device of claim 2, wherein each bidirectional semiconductor switch comprises a field-effect transistor in a rectifier bridge.

8. The load control device of claim 1, wherein the control circuit is operable to render the first switch non-conductive when the first capacitor has substantially charged to the first predetermined voltage and to render the second switch non-conductive when the second capacitor has substantially charged to the second predetermined voltage.

9. The load control device of claim 1, wherein the control circuit is operable to render the controllably conductive switches non-conductive when a current through the AC motor becomes substantially zero amps.

10. The load control device of claim 1, further comprising:
first and second discharge resistors coupled in parallel electrical connection with the first and second capacitors, respectively;

wherein the first and second capacitors are operable to slowly discharge after charging to the first and second predetermined voltages, respectively.

11. The load control device of claim 1, wherein the difference between the voltage across the first capacitor and the voltage across the second capacitor is no greater than 30 volts when the first and second switches are rendered conductive at approximately the same time during the third subsequent line cycle of the AC supply voltage.

12. The load control device of claim 11, wherein the difference between the voltage across the first capacitor and the voltage across the second capacitor is no greater than 20 volts when the first and second switches are rendered conductive at approximately the same time during the third subsequent line cycle of the AC supply voltage.

13. The load control device of claim 1, wherein a circulating current is produced in the first and second capacitors when the control circuit renders the first and second switches conductive at approximately the same time during the third subsequent line cycle of the AC supply voltage, and the circulating current has a magnitude no greater than approximately 32 amps.

14. The load control device of claim 13, wherein the circulating current has a magnitude no greater than approximately 21.2 amps.

15. The load control device of claim 1, wherein the control circuit renders the first and second switches conductive at approximately the same time during the third subsequent line cycle of the AC supply voltage when the AC supply voltage reaches its peak value.

16. The load control device of claim 1, wherein the first predetermined voltage is substantially the same as the second predetermined voltage.

17. The load control device of claim 1, wherein a first capacitance of the first capacitor is less than a second capacitance of the second capacitor, and the control circuit is operable to allow the first capacitor to charge before allowing the second capacitor to charge.

18. The load control device of claim 1, wherein the control circuit is operable to change the speed of the AC motor from an off speed to a substantially low speed by changing the speed of the AC motor to an intermediate speed less than a maximum speed of the AC motor prior to changing the speed of the AC motor to the substantially low speed.

19. A method for controlling the speed of an AC motor to be driven from an AC supply voltage of an AC power source, the method comprising the steps of:

coupling a first capacitor in series electrical connection between the AC power source and the AC motor;

coupling a second capacitor in series electrical connection between the AC power source and the AC motor;

coupling a first controllably conductive switch and a second controllably conductive switch in series electrical connection with the first capacitor and the second capacitor, respectively;

rendering both of the first and second switches non-conductive to turn off the motor;

rendering the first switch conductive and the second switch non-conductive to couple only the first capacitor in series electrical connection between the AC power source and the AC motor to control the speed of the motor to a first discrete speed;

rendering the second switch conductive and the first switch non-conductive to couple only the second capacitor in series electrical connection between the AC power source and the AC motor to control the speed of the motor to a second discrete speed;

rendering both of the first and second switches conductive to couple the parallel combination of the first and second capacitors in series electrical connection between the AC power source and the AC motor to control the speed of the motor to a third discrete speed;

changing the speed of the AC motor to the third speed by:
rendering the first switch conductive during a first line cycle of the AC supply voltage to allow the first capacitor to charge to approximately a predetermined voltage;

rendering the second switch conductive during a second subsequent line cycle of the AC supply voltage to allow the second capacitor to charge to approximately the predetermined voltage; and rendering the first and second switches conductive at approximately the same time during a third subsequent line cycle of the AC supply voltage.

20. The method of claim 19, wherein the controllably conductive switches comprise bidirectional semiconductor switches.

21. The method of claim 20, wherein the bidirectional semiconductor switches comprise triacs.

22. The method of claim 21, wherein the triacs become non-conductive when a current through the AC motor becomes substantially zero amps.

23. The method of claim 21, wherein the predetermined voltage is approximately the peak of the AC supply voltage.

24. The method of claim 19, wherein the difference between the voltage across the first capacitor and the voltage across the second capacitor is no greater than 30 volts when the first and second switches are rendered conductive at approximately the same time during the third subsequent line cycle of the AC supply voltage.

25. The method of claim 24, wherein the difference between the voltage across the first capacitor and the voltage across the second capacitor is no greater than 20 volts when the first and second switches are rendered conductive at approximately the same time during the third subsequent line cycle of the AC supply voltage.

26. The method of claim 19, wherein a circulating current is produced in the first and second capacitors during the step of rendering the first and second switches conductive at approximately the same time during the third subsequent line cycle of the AC supply voltage, and the circulating current has a magnitude no greater than approximately 32 amps.

27. The method of claim 26, wherein the circulating current has a magnitude no greater than approximately 21.2 amps.

28. The method of claim 19, wherein the step of changing the speed of the AC motor to the third speed further comprises:
rendering the first switch non-conductive after the first capacitor has substantially charged to the predetermined voltage; and
rendering the second switch non-conductive after the second capacitor has substantially charged to the predetermined level.

29. The method of claim 19, wherein changing the speed of the AC motor further comprises:
rendering the controllably conductive switches non-conductive when a current through the AC motor becomes substantially zero amps.

30. The method of claim 19, further comprising the step of:
changing the speed of the AC motor from an off speed to a substantially low speed by changing the speed of the AC motor to an intermediate speed less than a maximum speed of the AC motor, and changing the speed of the AC motor to the substantially low speed after the step of changing the speed of the AC motor to the intermediate speed.

31. A method for changing the speed of an AC motor in a load control device comprising a first capacitor and a second capacitor, each of the first and second capacitors adapted to be coupled in series electrical connection between an AC power source and the AC motor, a first controllably conductive switch coupled in series electrical connection with the first capacitor, and a second controllably conductive switch coupled in series electrical connection with the second capacitor, the first switch and the second switch both rendered non-conductive to turn off the motor, the first switch rendered conductive and the second switch rendered non-conductive to couple only the first capacitor in series electrical connection between the AC power source and the AC motor to control the speed of the motor to a first discrete speed, the second switch rendered conductive and the first switch rendered non-conductive to couple only the second capacitor in series electrical connection between the AC power source and the AC motor to control the speed of the motor to a second discrete speed, the first and second switches both rendered conductive to couple the parallel combination of the first and second capacitors in series electrical connection between the AC power source and the AC motor to control the speed of the motor to a third discrete speed, the method comprising the steps of:
rendering only the first switch conductive during a first line cycle of the AC supply voltage to allow the first capacitor to charge to approximately a predetermined voltage;
rendering only the second switch conductive during a second subsequent line cycle of the AC supply voltage to allow the second capacitor to charge to approximately the predetermined voltage; and
rendering both the first and second switches conductive at approximately the same time during a third subsequent line cycle of the AC supply voltage in order to control the speed of the AC motor to the third speed.

32. The method of claim 31, wherein the difference between the voltage across the first capacitor and the voltage across the second capacitor is no greater than 30 volts when the first and second switches are both rendered conductive at approximately the same time during the third subsequent line cycle of the AC supply voltage.

33. The method of claim 32, wherein the difference between the voltage across the first capacitor and the voltage across the second capacitor is no greater than 20 volts when the first and second switches are both rendered conductive at approximately the same time during the third subsequent line cycle of the AC supply voltage.

34. The method of claim 31, wherein a circulating current is produced in the first and second capacitors during the step of rendering both the first and second switches conductive at approximately the same time during the third subsequent line cycle of the AC supply voltage, and the circulating current has a magnitude no greater than approximately 32 amps.

35. The method of claim 34, wherein the circulating current has a magnitude no greater than approximately 21.2 amps.

36. The method of claim 31, further comprising the steps of:
rendering the first switch non-conductive when the first capacitor has substantially charged to the predetermined voltage; and
rendering the second switch non-conductive when the second capacitor has substantially charged to the predetermined voltage.

37. The method of claim 31, wherein the controllably conductive switches become non-conductive when a current through the AC motor becomes substantially zero amps.

* * * * *